United States Patent [19]
Malchow et al.

[11] Patent Number: 6,070,440
[45] Date of Patent: Jun. 6, 2000

[54] HIGH PRESSURE CLEANING VESSEL WITH A SPACE SAVING DOOR OPENING/CLOSING APPARATUS

[75] Inventors: Gregory L. Malchow, Oshkosh; Andrew Kegler; Stephen L. Harris, both of Ripon, all of Wis.

[73] Assignee: Raytheon Commercial Laundry LLC, Ripon, Wis.

[21] Appl. No.: 08/998,394

[22] Filed: Dec. 24, 1997

[51] Int. Cl.[7] .................................................. D06F 43/02
[52] U.S. Cl. ................................. 68/139; 68/196; 68/210
[58] Field of Search ........................... 68/210, 139, 196; 34/596, 601; 134/159, 200

[56] References Cited

U.S. PATENT DOCUMENTS

| | | |
|---|---|---|
| 3,498,089 | 3/1970 | Miller et al. ............................... 68/139 |
| 4,217,920 | 8/1980 | Ballard ................................. 134/200 X |
| 4,964,228 | 10/1990 | Coffman .................................. 34/601 X |
| 5,013,366 | 5/1991 | Jackson et al. . |
| 5,316,591 | 5/1994 | Chao et al. . |
| 5,339,844 | 8/1994 | Stanford, Jr. et al. . |
| 5,370,740 | 12/1994 | Chao et al. . |
| 5,456,759 | 10/1995 | Stanford, Jr. et al. . |
| 5,467,492 | 11/1995 | Chao et al. . |
| 5,482,211 | 1/1996 | Chao et al. . |
| 5,651,276 | 7/1997 | Purer et al. . |
| 5,669,251 | 9/1997 | Townsend et al. . |

FOREIGN PATENT DOCUMENTS

| | | | |
|---|---|---|---|
| 2067601 | 7/1981 | United Kingdom ..................... | 68/139 |

*Primary Examiner*—Philip R. Coe
*Attorney, Agent, or Firm*—Leydig, Voit & Mayer, Ltd.

[57] ABSTRACT

An apparatus for opening and closing a door of a pressure cleaning vessel for a dry cleaning system which requires minimal clearance to operate is provided. The apparatus includes a frame slidably attached to the cleaning vessel and having a base member with a pair of attached upstanding side arms which carry the door of the cleaning vessel. The apparatus further includes a first horizontal actuator carried by the cleaning vessel and operatively connected to the frame for moving the frame in a substantially horizontal direction relative to the cleaning vessel such that the door of the cleaning vessel moves between a closed position and an intermediate position wherein the door is substantially in front of the cleaning vessel. A second vertical actuator carried by at least one of the side arms and operatively connected to the door moves the door in a substantially vertical direction relative to the cleaning vessel and the frame between the intermediate position and an open position. Additionally, a shield may be provided on the upper side of the door in order to substantially block access to the area below the cleaning vessel when the cleaning vessel door is in the open position.

18 Claims, 9 Drawing Sheets

HIGH PRESSURE CLEANING VESSEL WITH A SPACE SAVING DOOR OPENING/ CLOSING APPARATUS

FIELD OF THE INVENTION

This invention generally relates to pressurized liquid cleaning apparatus and, more particularly, to an apparatus for opening and closing a door to a high pressure cleaning vessel which requires minimal clearance to operate.

BACKGROUND OF THE INVENTION

Known dry-cleaning processes consist of a wash, rinse, and drying cycle with solvent recovery. Garments are loaded into a basket in a cleaning drum and immersed in a dry-cleaning fluid or solvent, which is pumped into the cleaning drum from a base tank. Conventional dry-cleaning fluids include perchloroethylene (PCE), petroleum-based or Stoddard solvents, CFC-113, and 1,1,1-trichloroethane, all of which are generally aided by a detergent. The solvent is used to dissolve soluble contaminants, such as oils, and to entrain and wash away insoluble contaminants, such as dirt.

The use of these conventional solvents, however, poses a number of health and safety risks as well as being environmentally hazardous. For example, halogenated solvents are known to be environmentally unfriendly, and at least one of these solvents, PCE, is a suspected carcinogen. Known petroleum-based solvents are flammable and can contribute to the production of smog. Accordingly, dry cleaning systems which utilize dense phase fluids, such as liquid carbon dioxide, as a cleaning medium have been developed. An apparatus and method for employing liquid carbon dioxide as the dry-cleaning solvent is disclosed in U.S. Pat. No. 5,467,492, entitled "Dry-Cleaning Garments Using Liquid Carbon Dioxide Under Agitation As Cleaning Medium". A similar dry cleaning apparatus is also disclosed in U.S. Pat. No. 5,651,276.

These systems pose a number of other problems, particularly in relation to the high operating pressures necessary for maintaining the gas in a liquid state. For example, the various pressurized components of the system must be constructed with thick, heavy walled structures to withstand the elevated pressures encountered during the dry cleaning operation. These bulky structures can consume a significant amount of space if they are not carefully laid out. However, in order to encourage dry cleaning operators to convert to liquid carbon dioxide dry cleaning systems, these new systems must be configured so as to minimize space consumption. This is necessary to enable such systems to be placed into facilities and locations designed for existing dry-cleaning equipment. Moreover, due to the neighborhood nature of many dry cleaning operations, there can be even greater space limitations. Thus, while minimizing space requirements is always an important object, it is particularly important with dry cleaning equipment.

In terms of space consumption, one of the more critical aspects of a liquid carbon dioxide dry cleaning apparatus is the area required for opening and closing of the door of the pressurized cleaning vessel to permit loading and removal of garments or other items. Since the cleaning vessel in a liquid carbon dioxide system operates at a high pressure (e.g. 500–850 psi) under ambient temperature conditions in order to ensure that the carbon dioxide remains in a liquid phase, a relatively bulky, heavy walled door must be used. One type of door which could be used on such a liquid carbon dioxide cleaning vessel is a conventional hinged door. Due to the weight of the door, an opening mechanism typically would have to be provided for swinging the door to an open position at the side of the cleaning vessel. However, with such a hinged door a significant amount of clearance would have to be provided both in front of the cleaning vessel, to allow for the swinging motion of the door, and to at least one side of the cleaning vessel. Moreover, additional space would have to be provided for the door opening and closing mechanism.

The need to provide clearance in the front of the cleaning vessel could be eliminated by using a door which could slide horizontally into an open position, however once again clearance would have to provided on at least one side of the cleaning vessel to allow for the open door. Additionally, the mechanism for horizontally sliding the door to the open position would have to be arranged to the side of the cleaning vessel and likely would require additional space.

OBJECTS AND SUMMARY OF THE INVENTION

Accordingly, in view of the foregoing, it is a general object of the present invention to overcome the problems associated with the use of conventional doors and door opening mechanisms on high pressure cleaning vessels for dense phase liquid dry cleaning machine.

A more specific object of the present invention is to provide an apparatus for opening and closing a door to a high pressure cleaning vessel of a dry cleaning machine which requires minimal clearance space for operation.

Another object of the present invention is to provide an apparatus as characterized above which occupies a minimal amount of space in both the open and closed positions and operates entirely within the lateral confines of the cleaning vessel.

These and other features and advantages of the invention will be more readily apparent upon reading the following description of a preferred exemplary embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
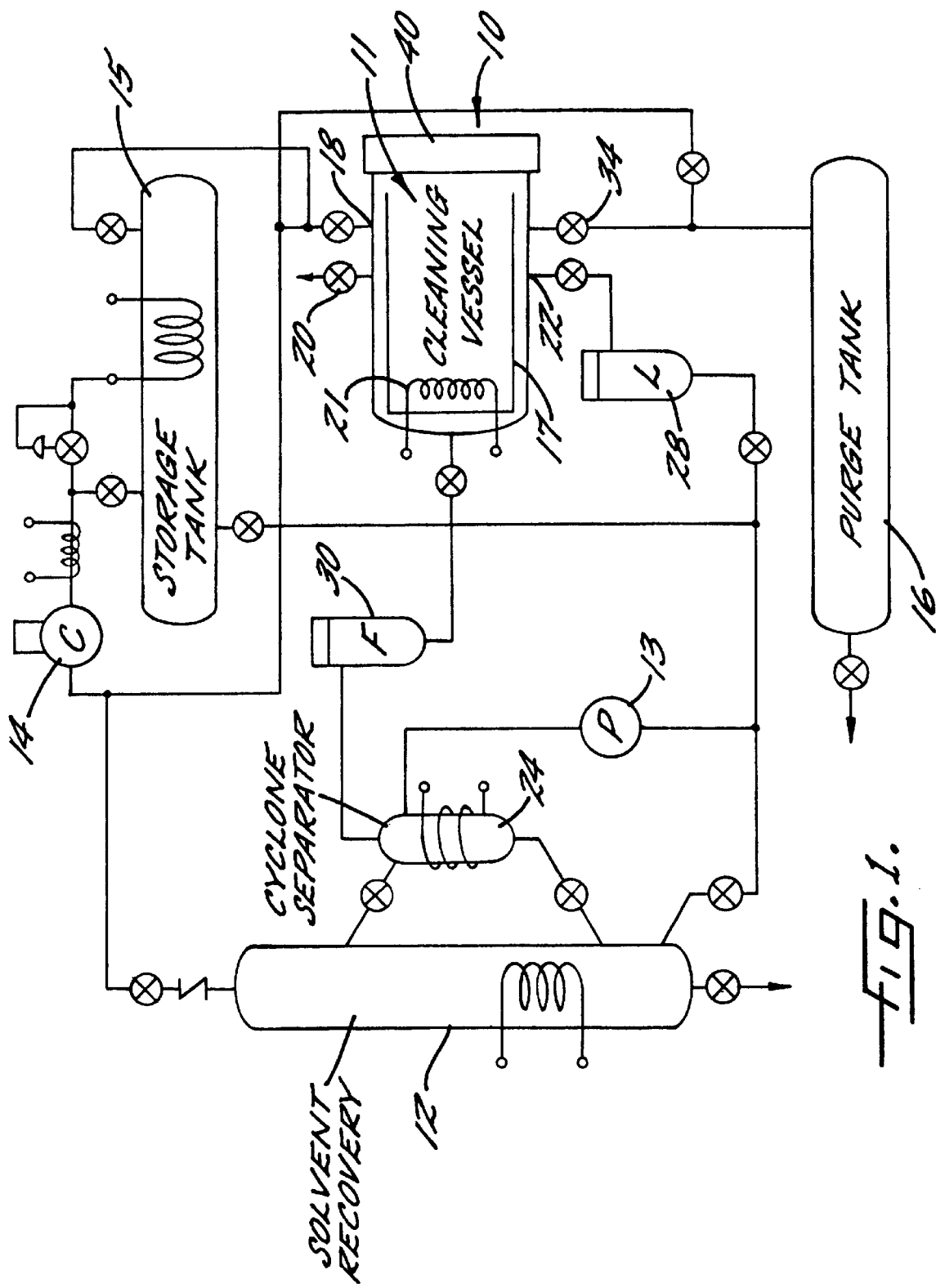
FIG. 1 is a schematic block diagram of an illustrative dense phase liquid dry cleaning apparatus having a cleaning vessel constructed in accordance with the teachings of the present invention.
Figure 2:
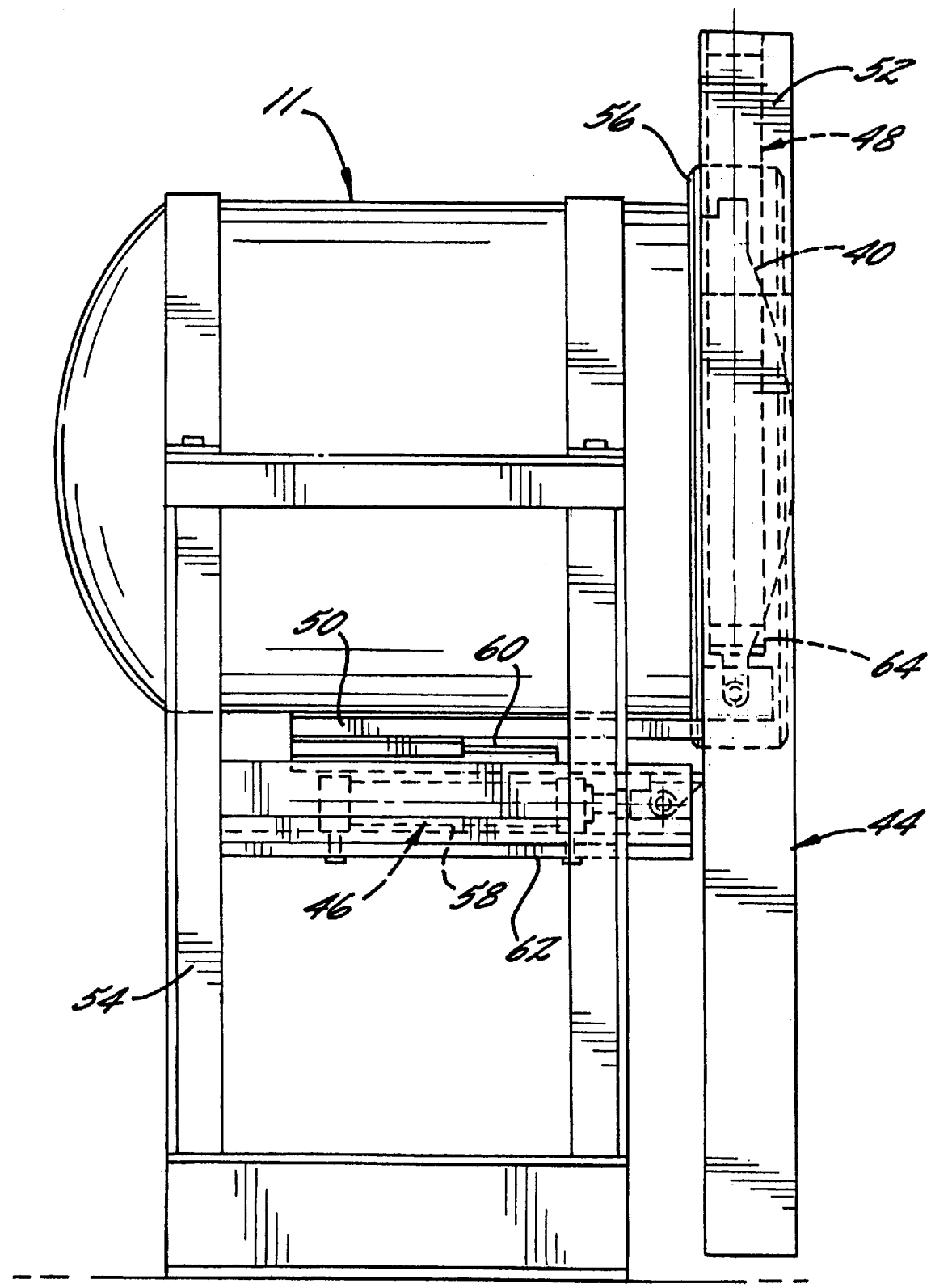
FIG. 2 is a side elevation view of the cleaning vessel of the illustrative dry cleaning apparatus showing the cleaning vessel door in a closed position.

Referring now more particularly to FIG. 1, there is shown a schematic block diagram of an illustrative dry-cleaning apparatus 10 which includes an associated pressure vessel in accordance with the present invention. As is described in more detail below, the illustrative dry-cleaning apparatus 10 utilizes liquid carbon dioxide as the dry-cleaning solvent in much the same manner as is described in U.S. Pat. Nos. 5,467,492 and 5,651,276. While the present invention is described in connection with a liquid carbon dioxide dry cleaning apparatus, which has particular use in cleaning garments, it will be readily appreciated that it is equally applicable to other types of cleaning processes which utilize a pressurized cleaning vessel. Moreover, the present invention could also be applied in other contexts, including other systems which utilize pressure vessels or chambers.

The major components of the dry-cleaning apparatus 10 include a substrate cleaning vessel 11, a solvent recovery device 12, a pump 13, a compressor 14, a storage tank 15 and a purge tank 16 all of which may be of a conventional type. As described in greater detail below, the cleaning vessel includes a door 40 which permits access to the interior through an opening in a front wall 42 of the vessel 11. Because of the pressures which are encountered during the dry cleaning process, the door 40 is a bulky relatively heavy walled structure. Instead of using conventional pressure vessels, the storage tank 15 and the purge tank 16 may be configured to be substantially self-supporting and useable as the support structure for other components of the dry cleaning apparatus 10 in order to reduce costs and space consumption as disclosed in as disclosed in commonly assigned U.S. application Ser. No. 08/998,289, filed Dec. 24, 1997.

To begin the dry cleaning process, soiled garments or other items to be dry cleaned are deposited in a perforated rotatable basket 17 which is supported in the cleaning vessel 11. The door 40 to the cleaning vessel 11 is then closed and the vessel charged with liquid carbon dioxide from the pressurized storage tank 15 through the inlet 18 in order to initiate the wash cycle. This and various other aspects of the cleaning process may be initiated and monitored through a control panel (not shown). Once charged with the liquid carbon dioxide, agitation may be applied to clean the items, to speed up the cleaning in general, aid in the removal of any insoluble soils, and to reduce the possibility of re-disposition of contaminants. This agitation may be accomplished by rotation of the basket 17 and/or by the direction of liquid carbon dioxide into the interior of the basket, as disclosed in commonly assigned U.S. application Ser. No. 08/998,399, filed Dec. 24, 1997. During the wash and rinse cycles, soluble contaminants dissolve in the liquid carbon dioxide. Once the wash and rinse cycles have been completed, the now contaminated liquid carbon dioxide is drained from the cleaning vessel during a drying/draining cycle.

For ensuring that the carbon dioxide is maintained in a liquid phase during cleaning, the cleaning vessel 11 may be further equipped with a pressure check valve 20, heat exchanger 21, pressure sensor, and temperature sensor to aid in temperature and pressure control of the carbon dioxide in the cleaning vessel 11. In order to effectively remove the contaminants from the items, the liquid carbon dioxide must be at a temperature at which the contaminants are substantially soluble. Accordingly, when liquid carbon dioxide is used, the desired pressure in the cleaning vessel 11 ranges from about 700 psi (48 bar) to about 850 psi (59 bar) while the temperature ranges from about 55° F. (13° C.) to about 80° F. (24° C.). At greater temperatures and pressures, the carbon dioxide will be in a supercritical fluidic state, and may be too aggressive for some dry-cleaning applications. When the system is used to clean garments, it is desirable to maintain the temperature above 32° F. as any drop below this critical temperature may cause damage to the garments.

For removing contaminants from the liquid carbon dioxide during the wash and rinse cycles, the liquid carbon dioxide preferably is cycled from the cleaning vessel 11 through outlet 22 to the solvent recovery device 12, which in the illustrated embodiment is configured as a still. The solvent recovery device 12 functions to vaporize the liquid carbon dioxide to separate and concentrate the particulates. During such processing, the clean gaseous carbon dioxide is directed to a condenser (not shown) where it is reliquified and then returned to the storage tank 15. Alternatively, the particulates may be removed from the liquid carbon dioxide by cooling the liquid to a point where the solvent capabilities of the liquified carbon dioxide do not allow the particulates to remain suspended, as disclosed in co-assigned application Ser. No. 08/998,392 filed Dec. 24, 1997. In order to provide a continuous separation of particles, for example from 20 to 100 microns, from the liquid stream, a cyclone separator 24 is provided. The separated particles are gravity fed from the cyclone separator 24 into the base of the solvent recovery device 12 where they can be removed as desired.

In order to circulate the liquified carbon dioxide through the apparatus, a pump 13 is provided. The pump 13 is used to transfer liquified carbon dioxide between the storage tank 15, the solvent recovery device 12, the cyclone separator 24 and/or the cleaning vessel 11. In order to protect the pump 13 from large particles for example, those greater than 40 microns, a lint trap 28 is provided. Preferably, the lint trap 28 is equipped with a removable inner basket to allow for easy access and to additionally provide a container within which detergent, surfactant, soap or the like may be dissolved into the cleaning solution as the wash cycle progresses. A filter 30 is also provided to remove finer particles, for example, 1 to 20 microns.

For removing gaseous carbon dioxide from the cleaning vessel 11, a compressor 14 is provided to pump gaseous carbon dioxide from the cleaning vessel 11 to a condensor (not shown) where it is condensed back into liquid phase and then redirected to the storage tank 15. It will be appreciated that during the wash and rinse cycles gaseous carbon dioxide may be released from the cleaning liquid and accumulate within the cleaning vessel 11. The gaseous carbon dioxide typically is evacuated from the cleaning vessel 11 and directed to the condensor during the washing and rinse cycles and upon completion of the washing operation prior to opening the cleaning vessel and removing the cleaned items. As understood by one skilled in the art, pumping gaseous carbon dioxide from the pressurized cleaning vessel 11 will reduce the internal pressure within the cleaning chamber with a resultant temperature decrease. Accordingly, an auxiliary heater may be provided in order to compensate for such temperature decrease and maintain the required temperature level within the pressurized cleaning vessel 11. Alternatively, the compressor 14 may be mounted in close proximity to the cleaning vessel 11 so that heat generated by the compressor 14 during its operation may be directly utilized by the cleaning vessel for maintaining the desired temperature level within the vessel, without the use of auxiliary heaters as disclosed in commonly assigned U.S. application Ser. No. 08/998,219, filed Dec. 24, 1997.

In order to control the pressure and temperature within the cleaning vessel 11, carbon dioxide may be quickly discharged from the cleaning vessel 11 to the purge tank 16 through valve 34 without the need for the compressor 14. While not related to pressure or temperature control, it is also noted that the purge tank 16 provides a source of low pressure, gaseous carbon dioxide which can be used to purge the cleaning vessel 11 of air before the wash cycle is commenced. As will be appreciated, the purge tank 16 can also be used in conjunction with the compressor 14 to provide a pressure drop in order to provide cooling as necessary to any component of the apparatus 10 by taking advantage of the refrigerative properties of the carbon dioxide.

In accordance with an important aspect of the present invention, the cleaning vessel 11 is equipped with an apparatus for opening and closing the door 40 which requires minimal clearance space for operation. In general, the door opening/closing apparatus first moves the door 40 in a generally horizontal direction away from the cleaning vessel 11 to an intermediate position and then in a vertical direction to a final open position. Unlike conventional swinging hinged or horizontally sliding doors, the opening/closing apparatus is adapted such that the door 40 never extends beyond the lateral confines of the dry cleaning apparatus 10 during the opening and closing operations. Accordingly, the need to provide clearance to the sides of the dry cleaning apparatus for the operation of the door is eliminated. As shown in FIGS. 2–9, the opening/closing apparatus generally comprises a frame 44 which carries the cleaning vessel door 40, a horizontal actuator assembly 46 and a vertical actuator assembly 48. The frame 44 includes a generally horizontal base member 50 to which a pair of upstanding and opposing side arms 52 are attached. As shown in the side view of FIG. 2, the side arms 52 extend from adjacent the top of the cleaning vessel 11 to nearly the base of a cradle 54 which supports the cleaning vessel 11. As described in greater detail below, the side arms 52 effectively carry the door 40 of the cleaning vessel as it is moved into the open position.

Figure 3:
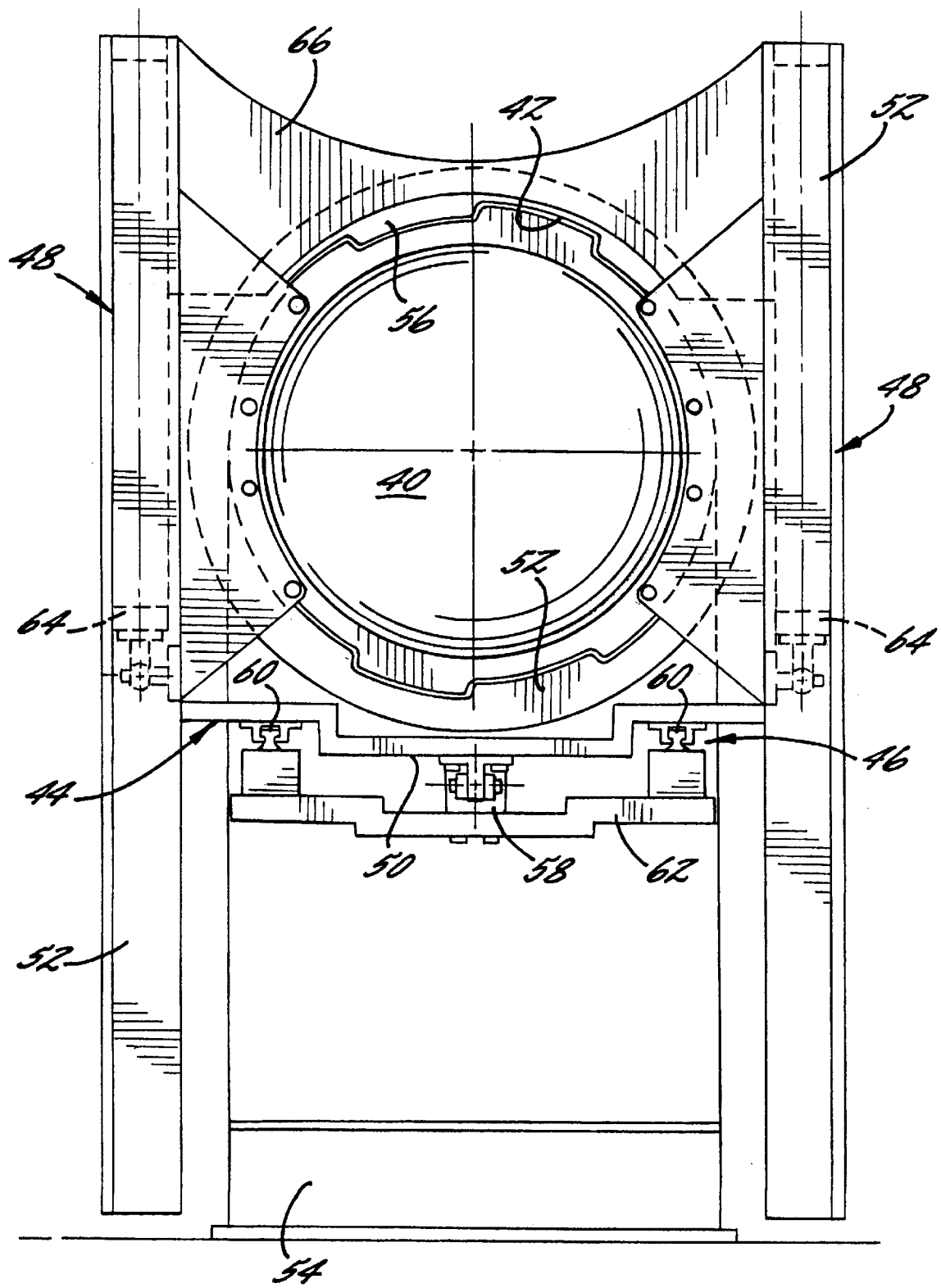
FIG. 3 is a front elevation view of the cleaning vessel showing the door in the closed position.
Figure 4:
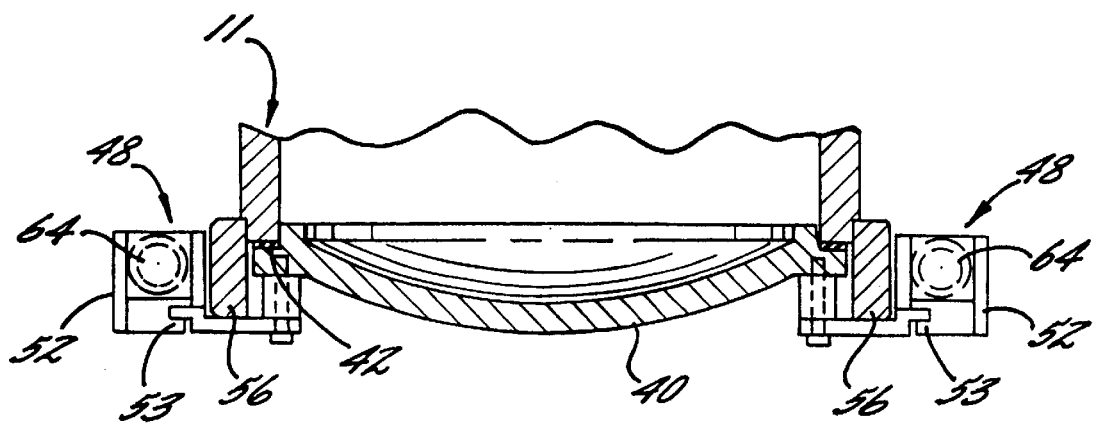
FIG. 4 is a partial top section view of the cleaning vessel showing the door in the closed position.
Figure 5:
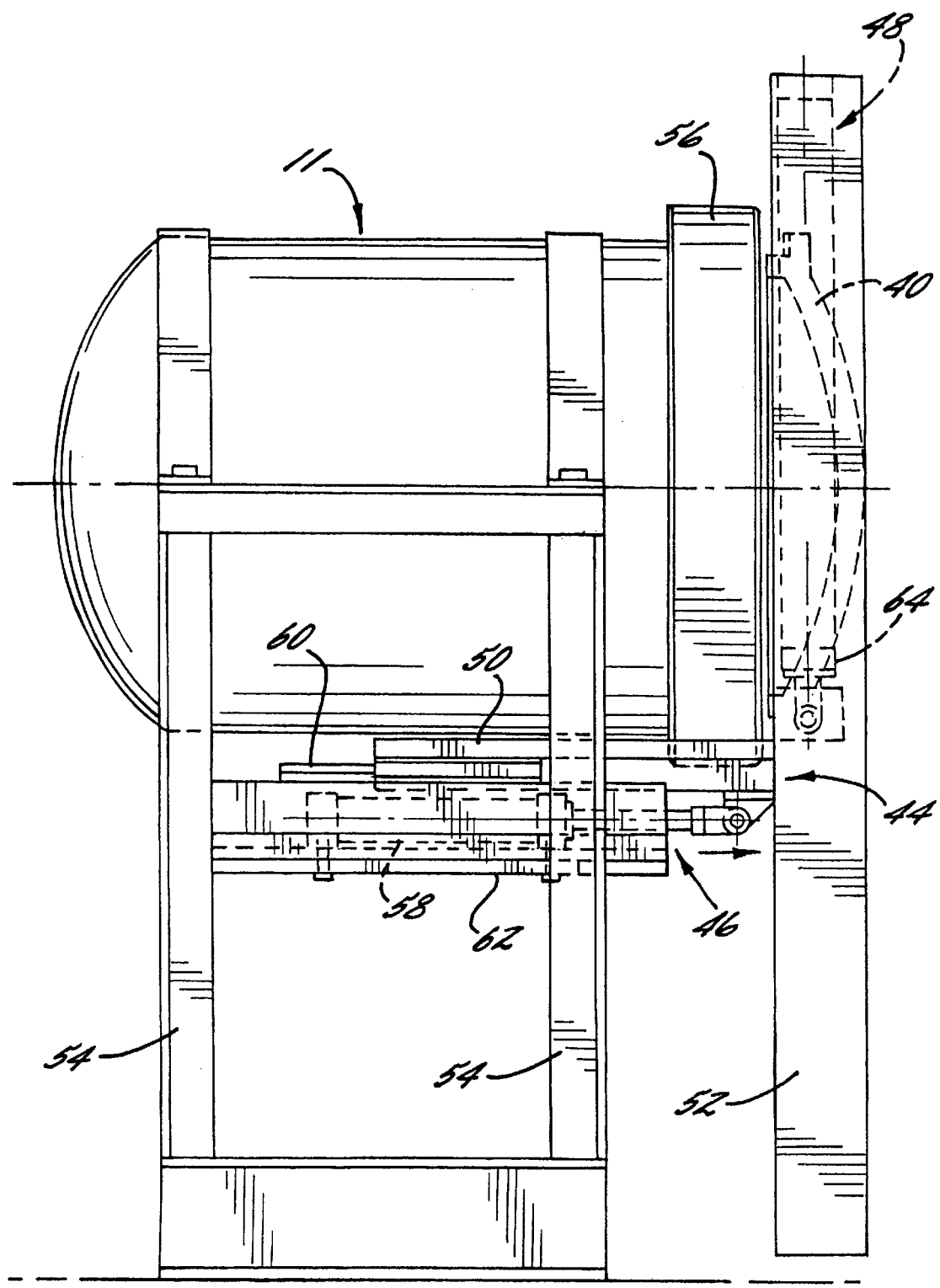
FIG. 5 is a side elevation view of the cleaning vessel showing the door in an intermediate position.

For effecting generally horizontal movement of the frame 44, and in turn the door 40, relative to the cleaning vessel 11 from the closed position (FIGS. 2–4) to an intermediate position (FIG. 5), the opening/closing apparatus includes a horizontal actuating assembly 46. In the closed position, the door 40 sealingly engages a locking ring 56 which surrounds the opening in the front wall 42 of the cleaning vessel 11 as best shown in FIGS. 3 and 4. The engagement of the door 40 with the locking ring 56 achieves a tight seal which allows the cleaning vessel 11 to be pressurized for the wash and rinse cycles. When it comes time to remove the garments or other items from the cleaning vessel 11 after completion of the dry cleaning process, the horizontal actuator assembly 46 moves the door 40 in a generally horizontal direction perpendicular to the front wall 42 of the cleaning vessel out of engagement with the locking ring 56 and to an intermediate position wherein the door and the side arms are spaced a short distance from the front of the cleaning vessel as shown in FIG. 5. To this end, the horizontal actuator assembly 46 includes a pneumatic actuating cylinder 58 and a pair of generally horizontal running rails 60 which are carried by the cleaning vessel 11. As best shown in FIG. 3, in the illustrated embodiment the rails 60 are arranged on a horizontal shelf 62 in the cradle 54 below the cleaning chamber and are operatively connected to the base member 50 such that the frame can slide horizontally relative cleaning vessel along the rails. The pneumatic cylinder 58 is also arranged generally horizontally on the cleaning vessel cradle 54 and is operatively connected to the frame 44 such that extension of the cylinder 58 moves the frame, and with it the door 40, from the closed position to the intermediate position. As will be appreciated, arranging the pneumatic cylinder 58 and the rails 60 in the cradle support structure 54 underneath the cleaning chamber also helps conserve space.

Figure 6:
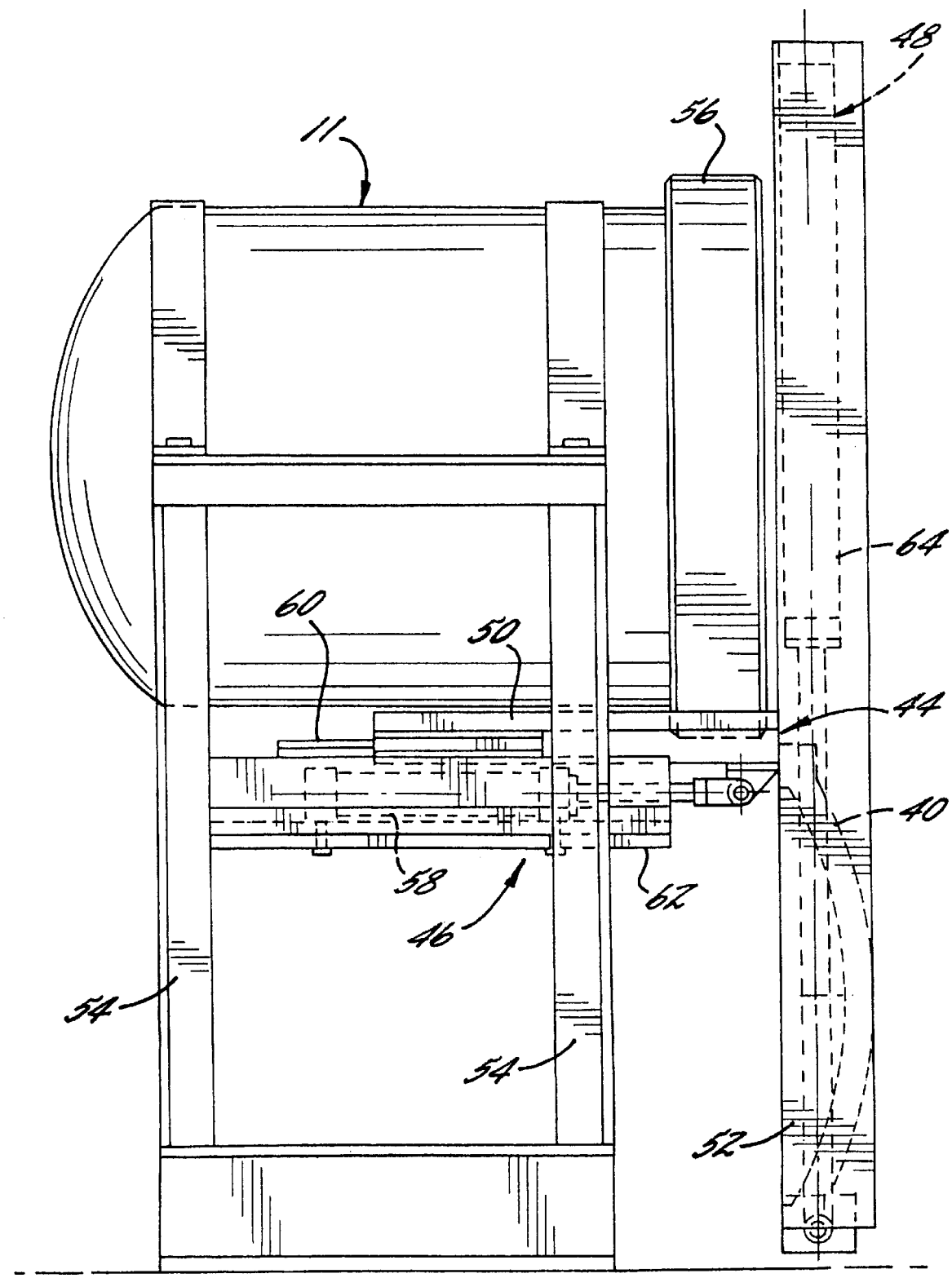
FIG. 6 is a side elevation view of the cleaning vessel showing the door in an open position.
Figure 7:
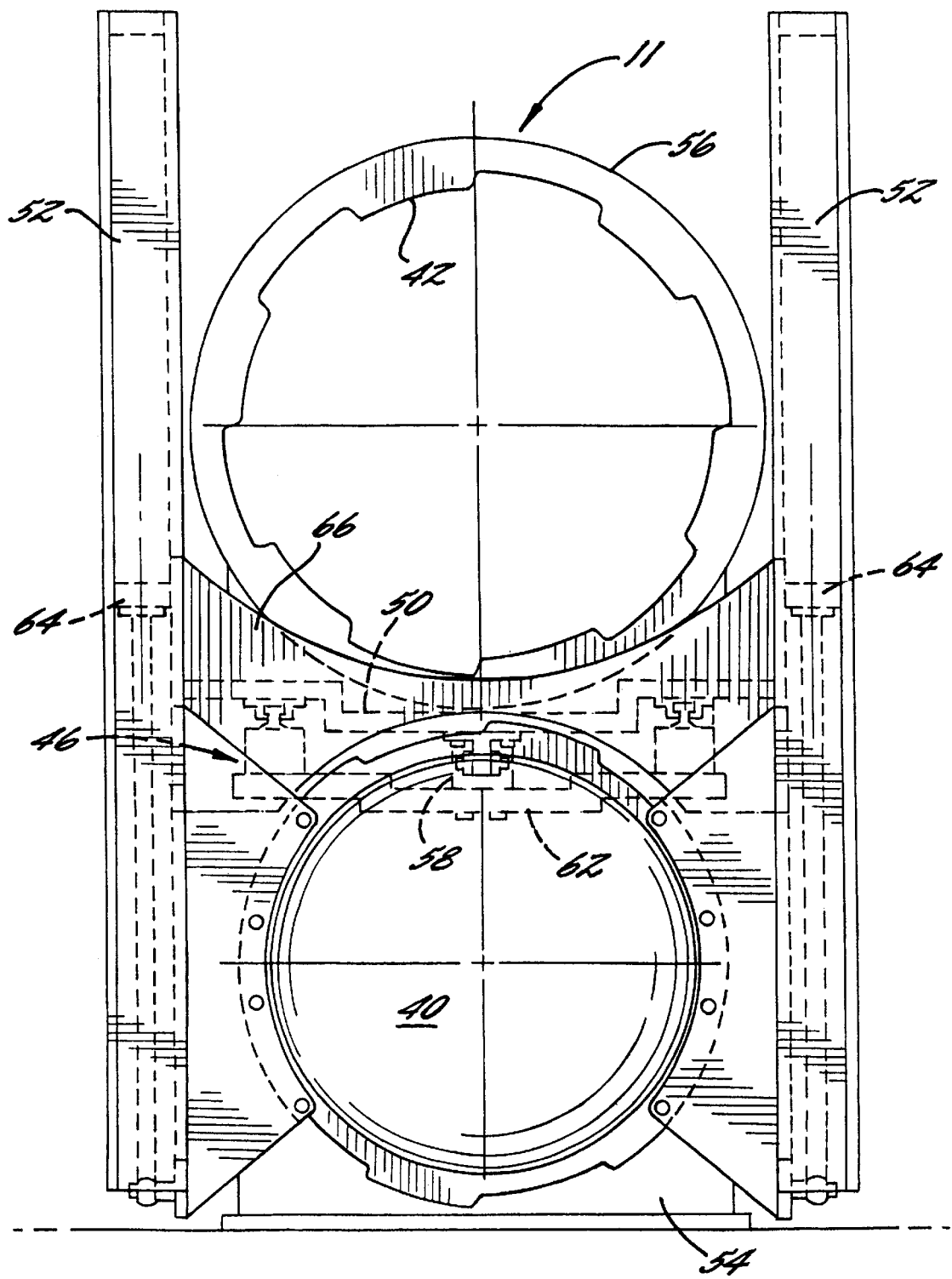
FIG. 7 is a front elevation view of the cleaning vessel showing the door in the open position.
Figure 8:
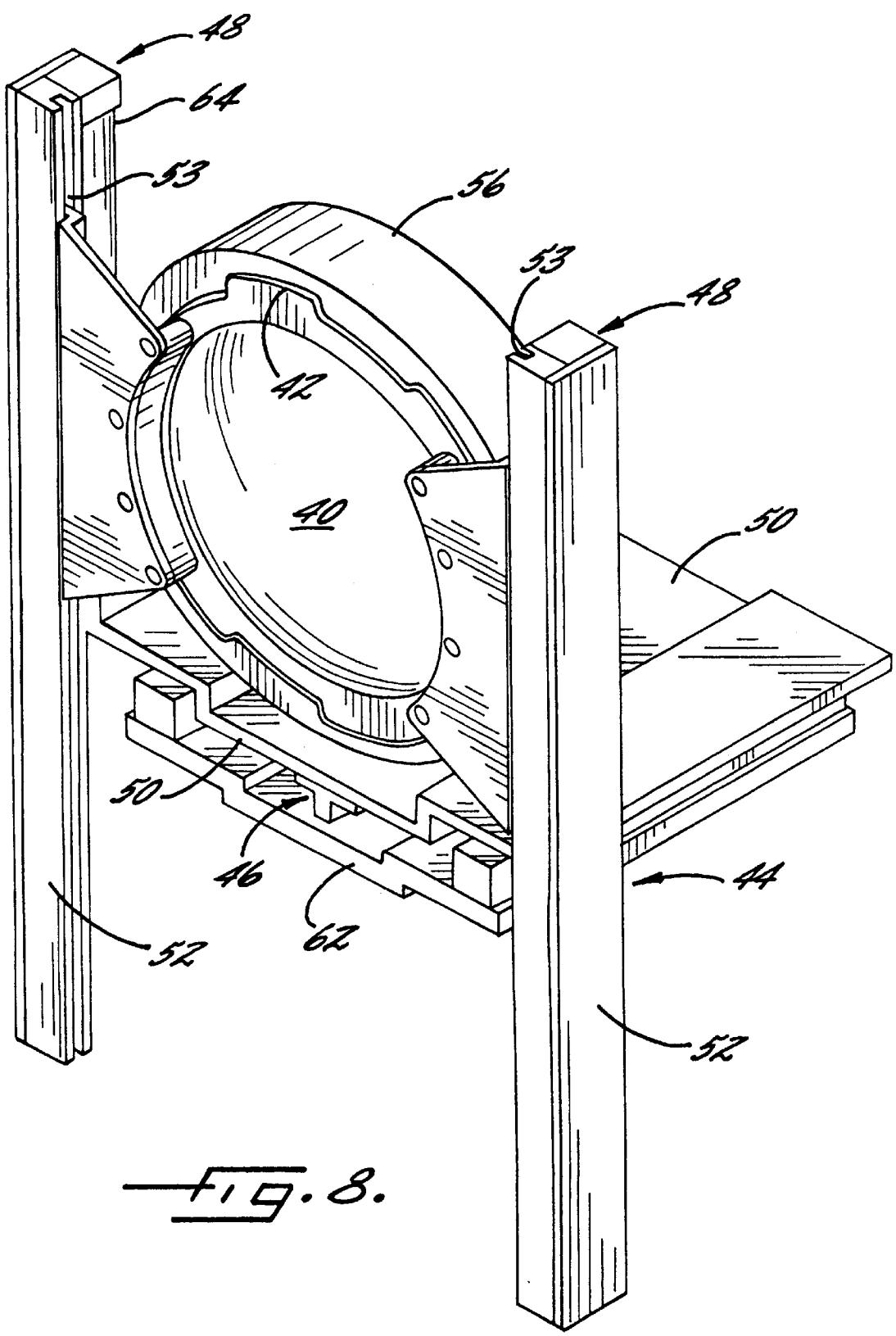
FIG. 8 is a front perspective view of the door opening/ closing apparatus of the illustrative cleaning vessel.
Figure 9:
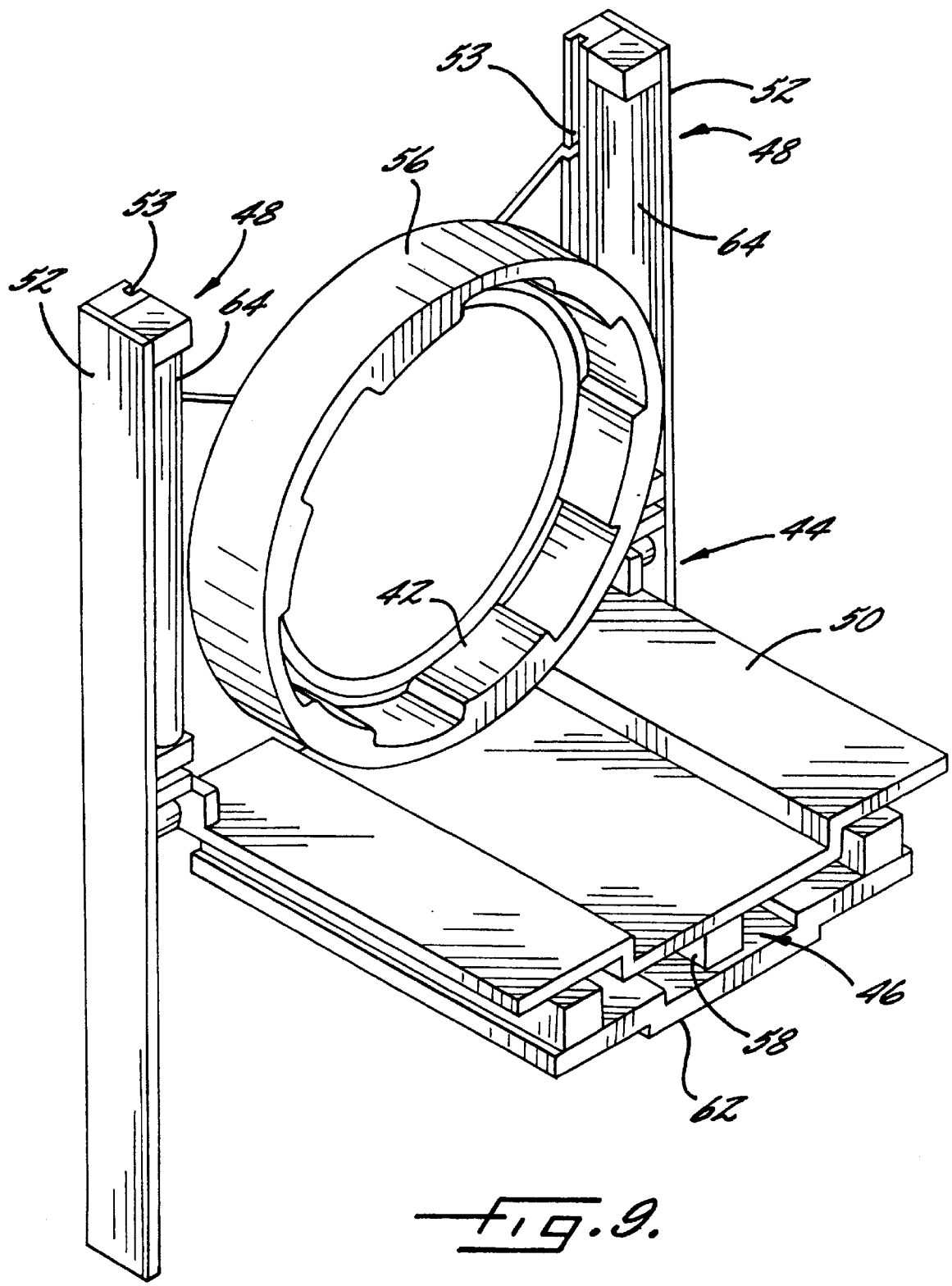
FIG. 9 is a rear perspective view of the door opening/ closing apparatus of the illustrative cleaning apparatus.

In order to effect generally vertical movement of the door relative to the cleaning vessel 11 and the side arms 52 from the intermediate position of FIG. 5 to a fully open position, the open/closing assembly includes a vertical actuating assembly 48. As best shown in FIGS. 6 and 7, the vertical actuating assembly 48 comprises a pair of pneumatic cylinders 64 each of which is carried in a vertical orientation by a respective one of the side arms 52 of the frame. In the illustrated embodiment, when the pneumatic cylinders 64 are extended, they lower the door 40 in a generally vertical direction parallel to the front wall of the cleaning vessel to the fully open position (FIGS. 6 and 7), wherein the door is arranged generally below the opening in the front wall 42 of the cleaning vessel. The side arms 52 shield the operation of the cylinders 64 in order to prevent objects or an operator's appendage from being caught. In addition, the side arms 52 may also include vertical ways 53 (FIGS. 4, 8 and 9) which slidingly receive a portion of the sides of the door 40 and guide the door as it is lowered. As shown in FIG. 7, once the door 40 is fully open, an operator has full access to the interior of the cleaning chamber for removing and loading garments or other items. As will be appreciated, the door 40 is closed simply by reversing the operation, i.e. first raising the door in a generally vertical direction to the intermediate position and then moving the door in a generally horizontally direction back into engagement with the locking ring 56. Moreover, while in the illustrated embodiment, the door is vertically lowered into the open position, it will be appreciated that the vertical actuating assembly could also be arranged to raise the door to an open position simply by reversing the orientation of the cylinders 64. Of course, clearance space would have to be provided above the cleaning vessel for the door. Lowering the door has the advantage that it utilizes space that is otherwise needed for the support cradle 54 and accordingly does not require any additional clearance space beyond the small space which is need for the horizontal movement.

In accordance with a further aspect of the present invention, the cleaning vessel door 40 may be equipped with a shield 66 which blocks access to the area below the cleaning vessel 11 when the door is in the open position. As shown in FIG. 3, the shield 66 is attached to the upper side of the door 40 and accordingly moves with the door to the open position. When the door 40 is in the open position as shown in FIG. 7, the shield 66 is arranged to block access to the area beneath the cleaning vessel 11 and thereby prevents garments or other items from being dropped or an appendage of the operator from becoming caught in any operating machinery which may be positioned in that area.

From the foregoing it can be seen that the door opening/closing apparatus of the cleaning vessel of the illustrative dry cleaning apparatus requires minimal clearance space to operate as compared to conventional swinging or horizontally sliding doors. As such, the dry cleaning apparatus can be installed into a significantly smaller space.

What is claimed is:

1. A dry cleaning apparatus for removing a contaminant from a substrate using a pressurized cleaning fluid comprising, in combination:

a substrate cleaning vessel having a door which permits access to the interior of the cleaning vessel, a frame including a base member and at least one side arm attached to the base member for carrying the cleaning vessel door, the base member being slidably attached to the cleaning vessel for substantially horizontal movement relative to the cleaning vessel;

a first actuator carried by the cleaning vessel and operatively connected to the frame for moving the frame in a substantially horizontal direction relative to the cleaning vessel such that the cleaning vessel door moves between a closed position wherein the door engages the opening in the front wall of the cleaning vessel and an intermediate position wherein the door is positioned substantially in front of the cleaning vessel; and a second actuator carried by at least one of the side arms and operatively connected to the cleaning vessel door for moving the door in a substantially vertical direction relative to the cleaning vessel and the frame between the intermediate position and an open position.

2. The apparatus according to claim 1 wherein the cleaning vessel door is positioned in front of and below the opening in the front wall of the cleaning vessel in the open position.

3. The apparatus according to claim 2 further including a shield attached to an upper side of the cleaning vessel door and adapted to substantially block access to the area below the cleaning vessel when the cleaning vessel door is in the open position.

4. The apparatus according to claim 1 wherein the frame is slidably attached to the cleaning vessel by at least one substantially horizontally extending rail arranged on the cleaning vessel.

5. The apparatus according to claim 1 wherein the first actuator comprises at least one pneumatic cylinder arranged on the cleaning vessel and operatively connected to the base member of the frame.

6. The apparatus according to claim 5 wherein the pneumatic cylinder extends in a substantially horizontal direction.

7. The apparatus according to claim 1 wherein the second actuator comprises at least one pneumatic cylinder arranged on the side arm and operatively connected to the cleaning vessel door.

8. The apparatus according to claim 7 wherein the pneumatic cylinder extends in a substantially vertical direction.

9. The apparatus according to claim 7 wherein the second actuator includes a pair of pneumatic cylinders each of which is arranged on a respective one of the side arms and operatively connected to the cleaning vessel door.

10. The apparatus according to claim 1 wherein the frame includes a pair of opposing side arms.

11. A dry cleaning apparatus for removing a contaminant from a substrate using a pressurized cleaning fluid comprising, in combination:

a substrate cleaning vessel having a door which permits access to the interior of the cleaning vessel, a frame including a base member and at least one side arm attached to the base member for carrying the cleaning vessel door, the base member being slidably attached to the cleaning vessel for movement relative to the cleaning vessel in a direction substantially perpendicular to the front wall of the cleaning vessel, a first actuator carried by the cleaning vessel and operatively connected to the frame for moving the frame relative to the cleaning vessel in a direction substantially perpendicular to the front wall of the cleaning vessel such that the cleaning vessel door moves between a closed position wherein the door engages the opening in the front wall of the cleaning vessel and an intermediate position wherein the door is positioned substantially in front of the cleaning vessel; and a second actuator carried by at least one of the side arms and operatively connected to the cleaning vessel door for moving the door relative to the cleaning vessel and the frame in a direction substantially parallel to the front wall of the cleaning vessel between the intermediate position and an open position.

12. The apparatus according to claim 11 wherein the cleaning vessel door is positioned in front of and below the opening in the front wall of the cleaning vessel in the open position.

13. The apparatus according to claim 12 further including a shield attached to an upper side of the cleaning vessel door and adapted to substantially block access to the area below the cleaning vessel when the cleaning vessel door is in the open position.

14. The apparatus according to claim 11 wherein the frame is slidably attached to the cleaning vessel by at least one rail arranged on the cleaning vessel and extending in a direction substantially perpendicular to the front wall of the cleaning vessel.

15. The apparatus according to claim 11 wherein the first actuator comprises at least one pneumatic cylinder arranged on the cleaning vessel and operatively connected to the base member of the frame.

16. The apparatus according to claim 15 wherein the pneumatic cylinder extends in a direction substantially perpendicular to the front wall of the cleaning vessel.

17. The apparatus according to claim 11 wherein the second actuator comprises at least one pneumatic cylinder arranged on the side arm and operatively connected to the cleaning vessel door.

18. The apparatus according to claim 17 wherein the pneumatic cylinder extends in a direction substantially parallel to the front wall of the cleaning vessel.

* * * * *